United States Patent
Fujita et al.

(10) Patent No.: US 6,997,242 B2
(45) Date of Patent: Feb. 14, 2006

(54) RESERVOIR WITH HYDROGEN STORAGE MATERIAL

(75) Inventors: Katsuyoshi Fujita, Kariya (JP); Hidehito Kubo, Kariya (JP); Keiji Toh, Kariya (JP); Hiroyuki Mitsui, Aichi-ken (JP); Sinichi Towata, Aichi-ken (JP); Kazuhiko Itoh, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/800,004

(22) Filed: Mar. 6, 2001

(65) Prior Publication Data

US 2001/0035281 A1 Nov. 1, 2001

(30) Foreign Application Priority Data

Mar. 7, 2000 (JP) .............................. 2000-061965

(51) Int. Cl.
F28D 15/00 (2006.01)
F25B 17/08 (2006.01)

(52) U.S. Cl. ...................... 165/104.12; 62/477; 62/480

(58) Field of Classification Search .......... 165/104.12, 165/176, 174; 62/476, 477, 480
See application file for complete search history.

(56) References Cited

U.S. PATENT DOCUMENTS

| | | | | |
|---|---|---|---|---|
| 4,205,531 A | * | 6/1980 | Brunberg et al. | 62/477 |
| 4,270,360 A | * | 6/1981 | Nakane et al. | 165/104.12 |
| 4,309,980 A | * | 1/1982 | McCormack et al. | 165/104.12 |
| 4,362,207 A | * | 12/1982 | Farfaletti-Casali et al. | 165/104.12 |
| 4,393,924 A | * | 7/1983 | Asami et al. | 165/104.12 |
| 4,581,049 A | * | 4/1986 | Januschkowetz | 62/480 |
| 4,589,479 A | * | 5/1986 | Gamo et al. | 165/104.12 |
| 4,609,038 A | * | 9/1986 | Ishikawa et al. | 165/104.12 |
| 4,809,774 A | * | 3/1989 | Hagemeister | 165/176 |
| 5,082,048 A | * | 1/1992 | Iwaki et al. | 165/104.12 |
| 5,165,247 A | * | 11/1992 | Rockenfeller et al. | 165/104.12 |
| 5,314,013 A | * | 5/1994 | Tanabe | 165/176 |
| 5,585,145 A | * | 12/1996 | Maier-Laxhuber et al. | 165/104.12 |
| 6,237,680 B1 | * | 5/2001 | Davis | 165/176 |
| 6,318,453 B1 | * | 11/2001 | Ovshinsky et al. | 165/104.12 |

FOREIGN PATENT DOCUMENTS

| | | | | |
|---|---|---|---|---|
| EP | 52422 A2 | * | 5/1982 | 165/104.12 |
| JP | 0068448 | * | 6/1978 | 165/104.12 |
| JP | 0103297 | * | 6/1985 | 165/104.12 |
| JP | 0066089 | * | 4/1986 | 165/104.12 |
| JP | 0288495 | * | 12/1987 | 165/104.12 |
| JP | 0031663 | * | 2/1991 | 62/480 |
| JP | 3244974 | * | 10/1991 | 62/480 |

(Continued)

*Primary Examiner*—Leonard R. Leo
(74) *Attorney, Agent, or Firm*—Morgan & Finnegan, LLP

(57) ABSTRACT

An HM reservoir for storing hydrogen includes a housing and a plurality of storage units. The storage units are stacked in the interior of the housing. Each storage unit includes a pair of plate-like molded bodies and a flat heat exchanger. The plate-like molded bodies are formed by compressing powder of hydrogen storage material. The heat exchanger is provided between the molded bodies. Each molded body includes a first side and a second side, which is opposite to the first side. The first side contacts the heat exchanger. A plurality of flat hydrogen passages are formed in the interior of the housing to face the second sides of the associated molded bodies. The structure of the HM reservoir is thus simple. Further, the molded bodies of the HM reservoir smoothly absorb hydrogen and smoothly release the same.

11 Claims, 4 Drawing Sheets

FOREIGN PATENT DOCUMENTS

| | | |
|---|---|---|
| JP | 6-193996 | 7/1994 |
| JP | 9-142801 | 6/1997 |

* cited by examiner

Fig.1(a)
Fig.1(b)
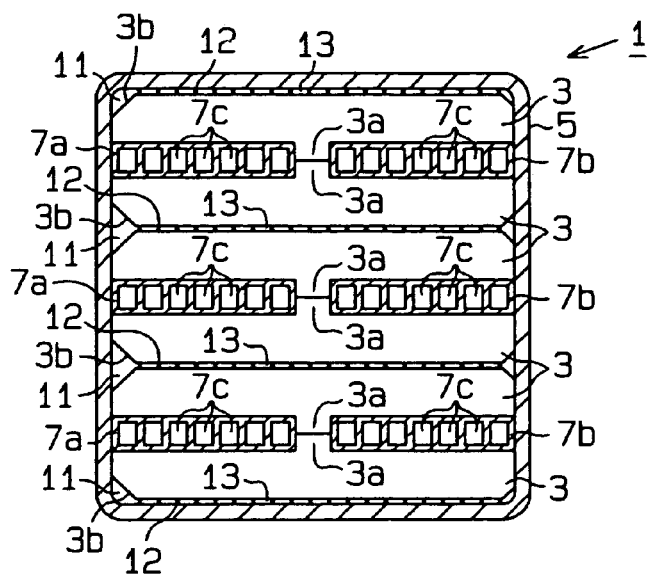
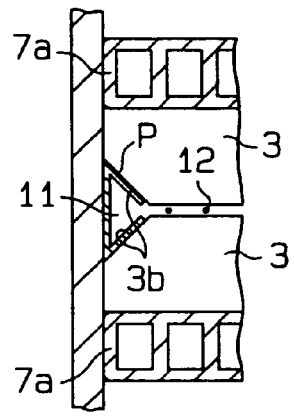
Fig.2
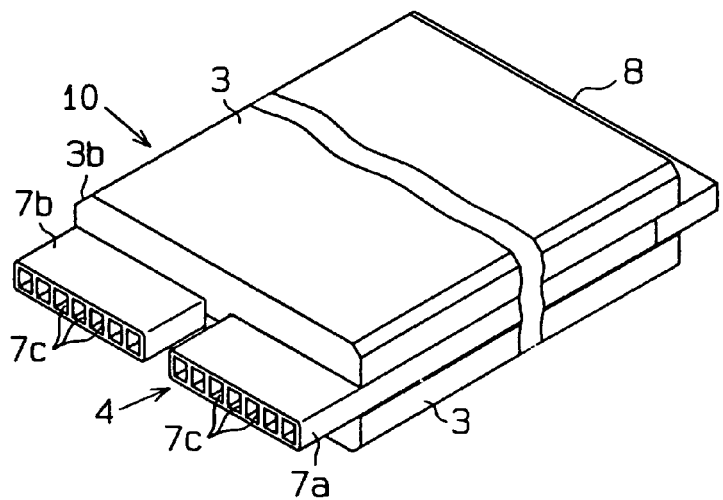

RESERVOIR WITH HYDROGEN STORAGE MATERIAL

BACKGROUND OF THE INVENTION

The present invention relates to reservoirs with hydrogen storage material for selectively storing and discharging hydrogen.

Like solar energy, hydrogen energy is now widely known as clean energy. However, to actually produce energy with hydrogen, easy storage and transportation of the substance is indispensable. Hydrogen storage material (hereinafter referred to as "HM"), which is, for example, an alloy, is considered as a solution to this problem. HM absorbs hydrogen to become a hydride at a certain pressure and at a certain temperature and releases hydrogen at a different pressure and at a different temperature. H/M is used as a hydrogen supply in hydrogen engines and fuel cells, which are now under development. Likewise, heat pumps that use H/M are now being developed. More specifically, the heat pumps use exothermic reaction and endothermic reaction caused by HM. The exothermic reaction takes place when H/M absorbs hydrogen, and the endothermic reaction takes place when HM releases hydrogen.

It is thus preferred that a reservoir with hydrogen storage material (hereinafter referred to as "HM reservoir") includes a heat exchanger. The heat exchanger allows HM to operate smoothly. Japanese Unexamined Patent Publication No. 6-193996 describes an HM reservoir shown in FIG. 8. The HM reservoir includes an outer housing 50 and an inner housing 51. The inner housing 51 accommodates a heat exchanger 54. The heat exchanger 54 includes a heat pipe 52 and a plurality of fins 53, which are aligned along the heat pipe 52. Each space between adjacent fins 53 is filled with NM powder (not shown). Hydrogen gas is supplied to the interior of the inner housing 51 through a hydrogen pipe 55. The gas is discharged to the exterior of the inner housing 51 through the hydrogen pipe 55.

As described, the heat exchanger 54 of this HM reservoir includes the fins 53. The structure of the HM reservoir is thus complicated, and the HM reservoir is not easy to assemble. Also, it is complicated and time consuming to fill HM powder in each space between adjacent fins 53 with uniform density. If the density is varied among different spaces, hydrogen is not smoothly released by HM powder in a space in which the density is relatively high. Further, when HM expands during hydrogen absorption, reactive force acts on the fins 53 non-uniformly due to the HM powder's density variation. This shortens life of the HM reservoir.

FIG. 9 shows an HM reservoir described in Japanese Unexamined Patent Publication No. 9-142801. The HM reservoir includes a container 56 that accommodates a plurality of HM molded bodies 57. An HM molded body 57 is formed by compressing a mixture of HM powder and binding material (fluorine contained resin). A hydrogen-gas-permeable sheet 58 is provided between adjacent HM molded bodies 57. Each sheet 58 forms a hydrogen gas passage. The sheet 58 corresponds to a hydrogen gas port 59 that extends through the container 56.

The HM reservoir of FIG. 9 that employs the HM molded bodies 57 solves the problem caused by the HM reservoir of FIG. 8, which uses HM powder. However, the publication corresponding to FIG. 9 does not specify a method for cooling the HM molded bodies 57 during hydrogen absorption or a method for heating the HM molded bodies 57 during hydrogen release.

Since exothermic reaction takes place when HM absorbs hydrogen, the material need be appropriately cooled to smoothly absorb hydrogen. In contrast, since endothermic reaction takes place when HM releases hydrogen, the material need be appropriately heated to smoothly release hydrogen. Accordingly, it is necessary to optimize a method for selectively heating and cooling HM to allow the material to operate smoothly. However, the HM reservoir of FIG. 9 does not include an internal mechanism for selectively heating and cooling HM, which should otherwise be incorporated in the container 56. It is thus necessary to provide an external means for selectively heating and cooling the container 56. In this case, heating and cooling of HM is not efficiently performed, and HM's hydrogen storage rate is reduced.

Particularly, if the HM reservoir is installed in a vehicle driven by a hydrogen engine or a fuel cell, it is necessary to minimize the reservoir while maximizing the amount of hydrogen stored in the reservoir. Accordingly, HM's hydrogen storage rate must be improved.

SUMMARY OF THE INVENTION

Accordingly, it is an objective of the present invention to provide a reservoir with hydrogen storage material that has a simple structure and enables the hydrogen storage material to smoothly absorb hydrogen and smoothly release the same.

To achieve the foregoing and other objectives and in accordance with the purpose of the present invention, the invention provides a reservoir for storing hydrogen that includes a housing and a molded body accommodated in the housing. The molded body is formed by compressing a hydrogen storage material powder. The molded body causes exothermic reaction when absorbing hydrogen and causes endothermic reaction when releasing hydrogen. The molded body has a first side and a second side opposite to the first side. The reservoir also includes a heat medium passage formed in the interior of the housing to face the first side of the molded body. Heat is transmitted from the molded body to a heat medium in the heat medium passage when the molded body absorbs hydrogen, and heat is transmitted from the heat medium in the heat medium passage to the molded body when the molded body releases hydrogen. The reservoir further includes a hydrogen passage formed in the interior of the housing to face the second side of the molded body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 1(a) is a cross-sectional view taken along line 1(a)–1(a) of FIG. 3 that shows an HM reservoir of an embodiment according to the present invention;

FIG. 1(b) is an enlarged view showing a portion of FIG. 1(a);

FIG. 2 is a perspective view showing a storage unit provided in the HM reservoir of FIG. 1(a);

DETAILED DESCRIPTION OF THE PREFERRED EMBODIMENTS

Figure 3:
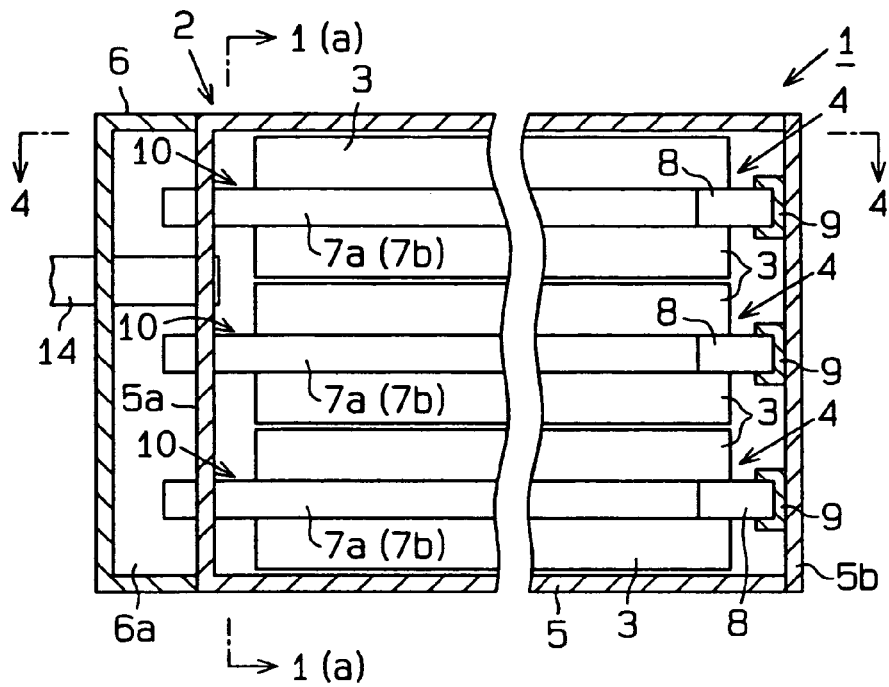
FIG. 3 is a cross-sectional view showing the HM reservoir.
Figure 4:
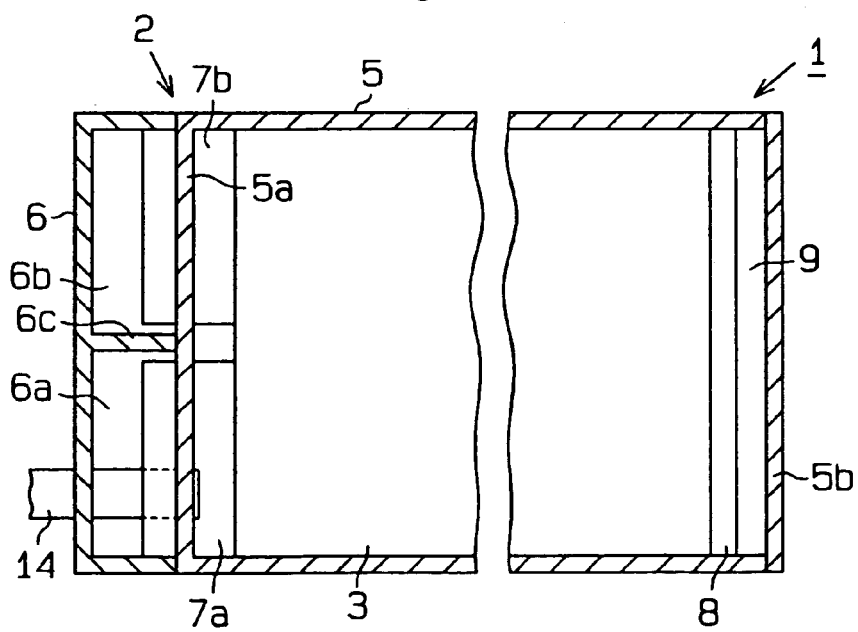
FIG. 4 is a cross-sectional view taken along line 4—4 of FIG. 3.

An embodiment of the present invention will now be described with reference to FIGS. 1 to 6. As shown in FIGS. 1(a), 3, and 4, an HM reservoir 1 includes a housing 2 and a plurality of (three in this embodiment) storage units 10. The storage units 10 are accommodated in the housing 2. Each storage unit 10 has a pair of HM molded bodies 3 and a heat exchanger 4 located between the HM molded bodies 3. Hereinafter, an upper section of the HM reservoir 1 in FIG. 1(a) is defined as an upper section of the HM reservoir 1, and a leftward section of the HM reservoir 1 in FIG. 3 or 4 is defined as a front section of the HM reservoir 1.

The housing 2 includes a main body 5 and a header 6. The main body 5 accommodates the storage units 10, and the header 6 supplies heat medium to a heat exchanger 4. Heat medium includes water, oil, or coolant. The main body 5 is prism-shaped and has an opening at its rear end. The main body 5 has a front wall 5a at its front end. The rear end of the main body 5, which is the opening, is closed by a lid 5b. Like the main body 5, the header 6 is prism-shaped and has an opening at its rear end. The rear, opening end of the header 6 is secured to the front wall 5a. A vertical partition wall 6c extends from a wall of the header 6. The partition wall 6c divides the space between the header 6 and the front wall 5a into an upstream chamber 6a and an a downstream chamber 6b. A heat medium supply line (not shown) is connected to the upstream chamber 6a, and a heat medium discharge line (not shown) is connected to the downstream chamber 6b.

As shown in FIGS. 1(a) to 4, each heat exchanger 4 includes a flat upstream duct 7a and a flat downstream duct 7b. Each upstream duct 7a is configured identically with each downstream duct 7b. A connecting duct 8 connects the rear end of the upstream duct 7a to the rear end of the downstream duct 7b. The upstream duct 7a and the downstream duct 7b extend in an fore-and-aft direction of the housing 2. Each upstream duct 7a forms a mirror image to the associated downstream duct 7b with respect to a hypothetical vertical plane located intermediate between the left side and the right side of the housing 2. The thickness, or the vertical dimension, of each duct 7a, 7b is equal to that of the connecting duct 8. Each upstream duct 7a, the associated downstream duct 7b, and the connecting duct 8, which connects the duct 7a to the duct 7b, are located along the same horizontal plane.

As shown in FIGS. 1(a) and 2, each duct 7a, 7b includes a plurality of holes 7c. The holes 7c extend parallel with each other in a longitudinal direction of the duct 7a, 7b. As shown in FIG. 3, each connecting duct 8 is secured to the lid 5b through a bracket 9. The front end of each upstream duct 7a projects into the upstream chamber 6a through a hole formed in the front wall 5a. The front end of each downstream duct 7b projects into the downstream chamber 6b through a hole formed in the front wall 5a. Heat medium flows from the upstream chamber 6a to the downstream chamber 6b through the upstream ducts 7a, the connecting ducts 8, and the downstream ducts 7b.

The HM molded bodies 3 are formed as follows. First, HM powder is mixed with powder of highly heat conductive material such as copper. The obtained mixture is compressed in a predetermined shape and is sintered. Each HM molded body 3 is shaped substantially as a square plate and has a projection 3a. The projection 3a projects from an intermediate position between the right side and the left side of the HM molded body 3. The projections 3a extend in the fore-and-aft direction of the housing 2. The projecting amount of each projection 3a is half of the thickness of each duct 7a, 7b. In each storage unit 10, the HM molded bodies 3 oppose each other with the projections 3a abutted by each other. The HM molded bodies 3 thus clamp the associated ducts 7a, 7b that are located at opposite sides of the projections 3a. In this state, the upper side of each duct 7a, 7b contacts the HM molded body 3 located upward, and the lower side of the duct 7a, 7b contacts the HM molded body 3 located downward.

As shown in FIGS. 1(a) to 2, a chamfer 3b is formed along one edge of each HM molded body 3, which extends longitudinally along the duct 7a, 7b. Each chamfer 3b forms space with respect to the corresponding side wall of the main body 5. A pipe P (shown only in FIG. 1(b)) extends in the space. The cross-sectional shape of the pipe P is substantially triangle. Each pipe P forms a main hydrogen passage 11. Further, the pipe P includes a slit.

Filters 12 are located between adjacent storage units 10. Filters 12 are also located between the upper wall of the main body 5 and the uppermost storage unit 10 and between the lower wall of the main body 5 and the lowermost storage unit 10. Each filter 12 is exposed to the slit of the associated pipe P. Hydrogen permeates through the filters 12. Thus, each filter 12 forms a hydrogen passage 13, which is connected to the associated main hydrogen passage 11. Each HM molded body 3 is located between the associated hydrogen passage 13 and the associated ducts 7a, 7b, in which heat medium flows. In other words, the HM molded body 3 has a first side that contacts the ducts 7a, 7b and a second side that faces the hydrogen passage 13. The second side is opposite to the first side, and the chamfer 3b is formed along one edge of the second side.

Although not illustrated, a clearance is formed between each side wall of the main body 5 and a corresponding side of each storage unit 10. The clearance allows the storage unit 10 to expand.

As shown in FIGS. 3 and 4, a pipe 14 is connected to the housing 2. The pipe 14 supplies hydrogen to the interior of the housing 2 and discharges the substance from the interior of the housing 2. An end of the pipe 14 extends through the header 6 and the front wall 5a, thus opening to the interior of the main body 5.

The HM reservoir 1 may be assembled as follows. First, the pipe 14 is attached to the header 6, and the header 6 is securely welded to the main body 5. The filters 12 and the storage units 10 are then inserted in the main body 5.

Subsequently, the lid 5b is securely welded to the main body 5 such that the brackets 9 engage with the associated connecting ducts 8.

If the HM reservoir 1 is installed in an electric vehicle driven by a fuel cell, the HM reservoir 1 may be used as a hydrogen supply for the fuel cell. Alternatively, if the vehicle includes a methanol reformer for generating hydrogen from methanol, the HM reservoir 1 is used as a buffer for temporarily storing hydrogen generated by the reformer. In the following description, the HM reservoir 1 is used as a hydrogen supply for a fuel cell.

When the fuel cell is activated, the HM reservoir 1 supplies hydrogen to the fuel cell through the pipe 14. In this state, the HM molded bodies 3 release hydrogen, thus causing endothermic reaction. Thus, if heat supplied to each HM molded body 3 is insufficient for releasing hydrogen, the temperature of the HM molded body 3 is lowered as the hydrogen release by the HM molded body 3 proceeds. This decreases hydrogen release performance of the HM molded body 3.

In this embodiment, however, when the HM reservoir 1 discharges hydrogen, the upstream chamber 6a of the header 6 is supplied with heat medium of a predetermined temperature through the heat medium supply line. The heat medium flows from the upstream chamber 6a to the upstream ducts 7a. The heat medium then passes through the connecting ducts 8 and the downstream ducts 7b and enters the downstream chamber 6b. The heat medium is then discharged from the downstream chamber 6b to the exterior of the HM reservoir 1 through the heat medium discharge line. In this manner, the HM molded bodies 3 are heated to a predetermined temperature by heat medium, thus releasing hydrogen further smoothly. More specifically, the released substance passes through fine apertures of the HM molded bodies 3 and enters the associated hydrogen passages 13. The substance then flows to the associated main hydrogen passages 11 and flows to the pipe 14.

The amount of hydrogen released by the HM molded bodies 3 is varied in relation to the temperature of the HM molded bodies 3. Accordingly, the temperature or flow rate of the heat medium is adjusted to supply a required amount of hydrogen to the fuel cell.

Hydrogen is supplied to the HM reservoir 1 through the pipe 14 such that the HM molded bodies 3 absorb the substance. More specifically, the substance flows from the main hydrogen passages 11 to the hydrogen passages 13 and is exposed to the HM molded bodies 3. At this stage, reaction occurs between hydrogen and HM, resulting in a hydride. Hydrogen is thus stored in the HM molded bodies 3 in a form of hydride.

When the HM molded bodies 3 absorb hydrogen, exothermic reaction takes place. In this state, if heat generated by the HM molded bodies 3 is accumulated, the reaction is hampered such that hydrogen absorption performance of the HM molded bodies 3 decreases. However, in this embodiment, when hydrogen is supplied to the HM reservoir 1, the upstream chamber 6a of the header 6 is supplied with heat medium of a relatively low temperature through the heat medium supply line. The heat medium cools the HM molded bodies 3 while passing through the heat exchangers 4. The heat medium is thus warmed and is discharged to the exterior of the HM reservoir 1 via the heat medium discharge line. This improves the hydrogen absorption performance of the HM molded bodies 3.

The heat conductivity of HM powder is as low as those of wood or bricks. Thus, if HM powder is filled in an HM reservoir, the heat exchanger of the HM reservoir must include a large number of fins. Otherwise, heat exchange between the powder and the heat exchanger is not accomplished sufficiently. In contrast, the heat conductivity of the HM molded bodies 3 is largely increased, as compared to that of HM powder. Accordingly, heat exchange between the HM molded bodies 3 and the heat exchangers 4 is optimally performed without the fins. This further improves the hydrogen absorption performance and the hydrogen release performance of the HM molded bodies 3.

Figure 5:
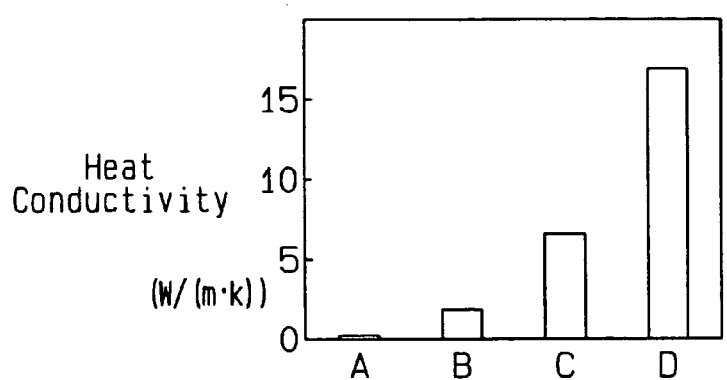
FIG. 5 is a graph representing the relationship between heat conductivity of an HM molded body and copper rate of the HM molded body.

FIG. 5 is a graph representing the heat conductivity of an HM molded body and the copper rate of the same. Sample A is HM powder as a reference example. Sample B is an HM molded body that contains zero weight percent of copper. Sample C is an HM molded body that contains thirty weight percent of copper. Sample D is an HM molded body that contains fifty weight percent of copper. As shown in FIG. 5, even Sample B has an increased heat conductivity, as compared to Sample A, which is HM powder. The graph indicates that the heat conductivity increases as the copper rate increases. Thus, the copper rate of the HM molded bodies 3 may be adjusted to store a desired amount of hydrogen in the HM molded bodies 3.

The speed at which hydrogen moves in the HM molded bodies 3 changes the speed at which the HM molded bodies 3 absorb or release hydrogen. As the hydrogen movement speed increases, or hydrogen's permeation resistance with respect to the HM molded bodies 3 decreases, the speed at which the HM molded bodies 3 absorb or release hydrogen becomes higher.

Figure 6:
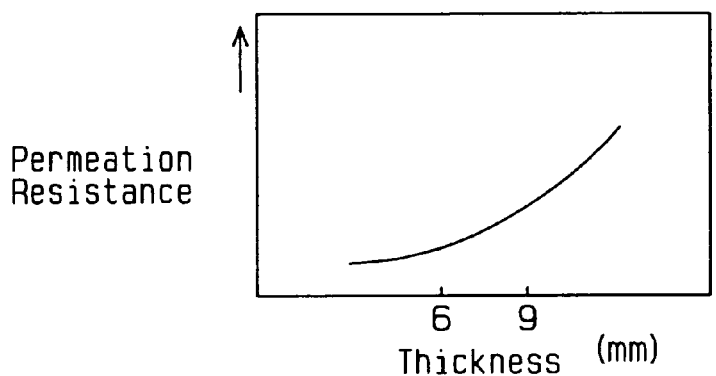
FIG. 6 is a graph representing the relationship between thickness, or a vertical dimension, of an HM molded body and hydrogen's permeation resistance with respect to the HM molded body.

FIG. 6 is a graph representing the relationship between thickness, or a vertical dimension, of an HM molded body and hydrogen's permeation resistance with respect to the HM molded body. As shown in FIG. 6, the hydrogen's permeation resistance with respect to the HM molded body is increased as the thickness of the HM molded body increases. In other words, if the thickness of the HM molded body is relatively small, hydrogen is absorbed or released at a relatively high speed. However, if the thickness of the HM molded bodies 3 is reduced, an increased number of storage units 10 need be installed in the HM reservoir 1. The volume of the hydrogen passages 13 in the HM reservoir 1 is thus increased. That is, the total weight of the HM molded bodies 3 accommodated in the HM reservoir 1 is decreased. This reduces the amount of hydrogen stored in the HM reservoir 1. Accordingly, the thickness of the HM molded bodies 3 is selected to optimize both the hydrogen storage amount of the HM reservoir 1 and the hydrogen absorption/release speed of the HM molded bodies 3. It is preferred that the thickness of the HM molded bodies 3 is equal to or smaller than ten millimeters.

The illustrated embodiment has the following advantages.

The HM molded bodies 3, which are obtained by compressing HM powder in a predetermined shape and sintering the same, have an increased heat conductivity. This enables the HM molded bodies 3 to smoothly absorb hydrogen and smoothly release the same.

The HM molded bodies 3 contain copper, which has an improved heat conductivity. This further increases the heat conductivity of the HM molded bodies 3.

The shapes of the HM molded bodies 3 and the ducts 7a, 7b, 8 are flat and are relatively simple. It is thus easy to fabricate the HM molded bodies 3 and the ducts 7a, 7b, 8.

Each HM molded body 3 is located between the associated hydrogen passage 13 and the associated heat exchanger 4. While the HM molded body 3 is flat, the hydrogen passage 13 and the heat exchanger 4 are also flat. This increases the contact area of the HM molded body 3 with respect to the hydrogen passage 13 and the heat exchanger 4. The HM molded body 3 thus efficiently absorbs hydrogen from the hydrogen passage 13 and efficiently releases hydrogen to the hydrogen passage 13. Also, heat exchange between the HM molded body 3 and the heat exchanger 4 is optimized. The hydrogen passage 13 and the heat exchanger 4 may thus be formed further flat. This increases the total weight of the HM molded bodies 3 in the HM reservoir 1. The amount of hydrogen stored in the HM reservoir 1 is thus increased.

Each hydrogen passage 13 is formed by the filter 12 through which hydrogen permeates. The filter 12 prevents the associated hydrogen passage 13 from being blocked due to expansion of the HM molded bodies 3. Further, the filter 12 holds HM particles separated from the associated HM molded bodies 3. This prevents the particles from being discharged from the HM reservoir 1.

The HM molded bodies 3 of each storage unit 10 clamp the ducts 7a, 7b at opposite sides of the projections 3a, which abut against each other. This structure makes it easy to assemble the storage unit 10.

The main hydrogen passages 11 are formed by the chamfers 3b of the associated HM molded bodies 3. The main hydrogen passages 11 are thus formed easily. Further, the pipes P are provided in the spaces formed by the associated chamfers 3b. The pipes P prevent the associated main hydrogen passages 11 from being blocked due to expansion of the HM molded bodies 3.

The present invention may be embodied as follows.

Figure 7:
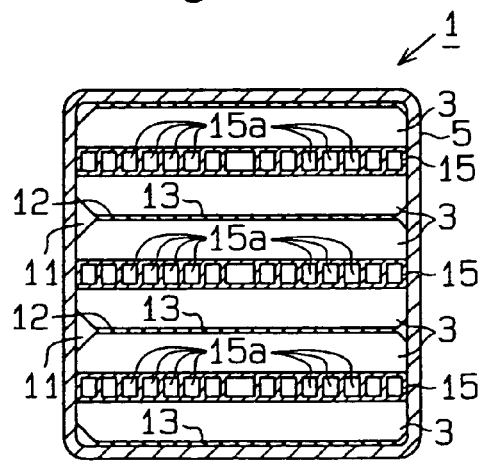
FIG. 7(a) is a cross-sectional view showing an HM reservoir of another embodiment according to the present invention.
FIG. 7(b) is a cross-sectional view showing an HM reservoir of another embodiment according to the present invention.
Figure 7:
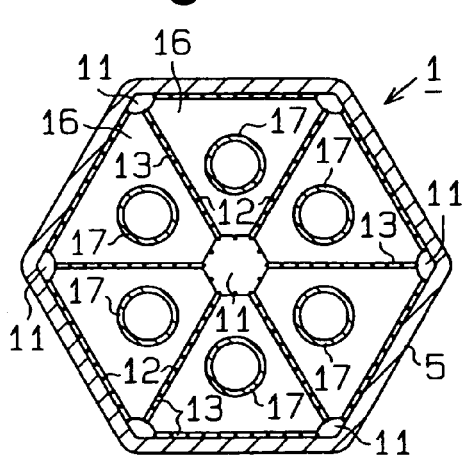
Figure 8:
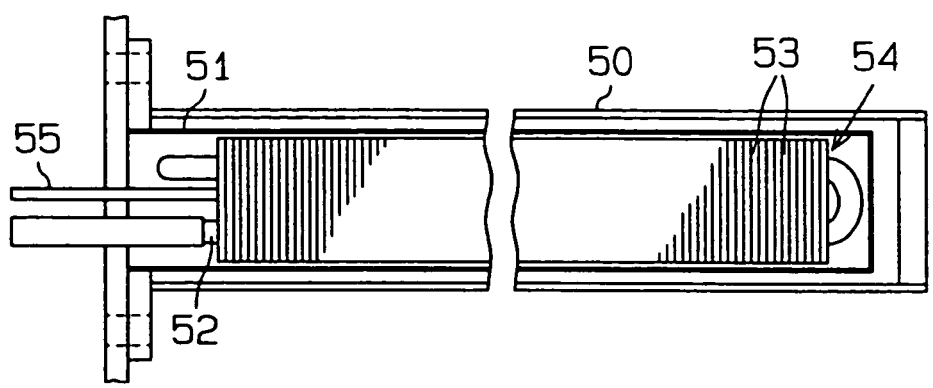
FIG. 8 is a cross-sectional view showing a prior art HM reservoir; an d
Figure 9:
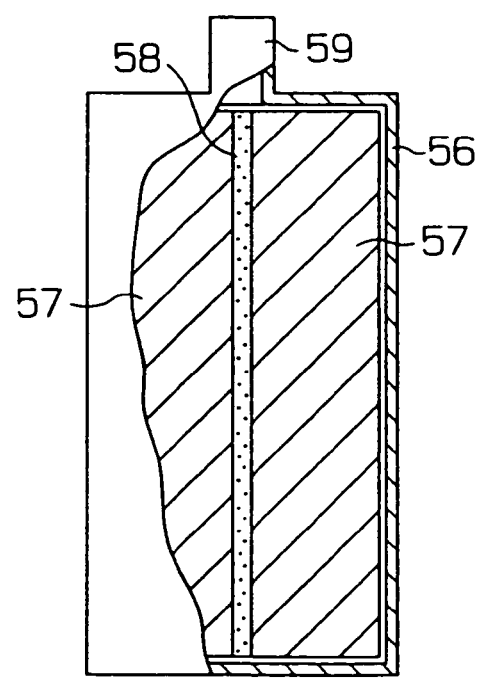
FIG. 9 is a partially broken front view showing another prior art HM reservoir.

In the embodiment illustrated in FIGS. 1 to 6, each heat exchanger 4, which includes the ducts 7a, 7b, 8, forms a substantially U-shaped heat medium passage. However, as shown in FIG. 7(a), the heat exchanger 4 may include a single duct 15. The duct 15 has a plurality of aligned holes 15a and is shaped as a flat square plate. The holes 15a extend parallel with each other in the fore-and-aft direction of the housing 2. In this case, the HM reservoir 1 includes a pair of headers 6 located at the front and rear sides of the body 3. One header 6 forms the upstream chamber 6a, and the other forms the downstream chamber 6b. Heat medium flows from the upstream chamber 6a to the downstream chamber 6b through the holes 15a. This structure simplifies the configuration of the heat exchangers 4 and the HM molded bodies 3.

The holes 7c, 15a of each duct 7a, 7b, 15 need not be located independent from each other. Instead, the duct 7a, 7b, 15 may include a single independent hole, which is a flat opening.

The pipe P, which forms each main hydrogen passage 11, may be omitted.

The number of the storage units 10 accommodated in the HM reservoir 1 does not necessarily have to be three.

In the illustrated embodiment, the storage units 10, each of which includes a pair of HM molded bodies 3 and a single heat exchanger 4, are provided in the HM reservoir 1. However, the HM molded bodies 3 and the heat exchangers 4 may be simply stacked in the HM reservoir 1 without forming the storage units 10.

As shown in FIG. 7(b), a plurality of substantially triangular-prism-shaped HM molded bodies 16 may be accommodated in a main body 5 that has a substantially hexagonal cross-sectional shape. Filters 12 are located between adjacent sides of the HM molded bodies 16. Filters 12 are also located along the outer sides of the HM molded bodies 16. The filters 12 each form a passage 13. A main hydrogen passage 11 is formed in the middle of the main body 5. A main hydrogen passage 11 is also formed along each corner of the main body 5. A through hole extends through each HM molded body 16, and a duct 17 is received in each through hole. Heat medium flows in the duct 17. As shown in FIG. 7(b), the cross-sectional shape of each duct 17 is circular. However, the cross-sectional shape of the duct 17 may be similar to that of the HM molded body 16. Further, the cross-sectional shape of the main body 5 and that of the HM molded bodies 16 are not restricted to those illustrated in FIG. 7(b) but may be, for example, circular or oval.

The filters 12 do not necessarily have to be provided in the HM reservoir 1. In this case, a spacer is used instead of each filter 12 to form the passages 13. Further, a filter must be attached to the opening end of the pipe 14.

Although the HM reservoir 1 is used in a fuel cell type electric vehicle in the illustrated embodiment, the HM reservoir 1 may be applied to other devices that use hydrogen such as hydrogen engines and heat pumps.

Therefore, the present examples and embodiments are to be considered as illustrative and not restrictive and the invention is not to be limited to the details given herein, but may be modified within the scope and equivalence of the appended claims.

What is claimed is:

1. A reservoir for storing hydrogen, comprising:
   a housing;
   a molded body comprising a compressed hydrogen storage material powder accommodated in the housing, the molded body causes exothermic reaction when absorbing hydrogen and causes endothermic reaction when releasing hydrogen, and the molded body has a first side and a second side opposite to the first side, wherein the molded body has a plate-like shape, the first and second sides of the molded body are flat, and the thickness of the molded body is equal to or smaller than ten millimeters;
   a heat medium passage formed in the interior of the housing to face the first side of the molded body, wherein the heat medium passage is flat, wherein heat is transmitted from the molded body to a heat medium in the heat medium passage when the molded body absorbs hydrogen, and heat is transmitted from the heat medium in the heat medium passage to the molded body when the molded body releases hydrogen, and wherein the heat medium passage includes a duct that has a plurality of holes that extend parallel with each other in a longitudinal direction of the duct, wherein the duct is flat, and the duct contacts the first side of the molded body; and
   a filter which forms a hydrogen passage, wherein the hydrogen passage is formed in the interior of the housing to face the second side of the molded body, wherein the hydrogen passage is flat,
   wherein the molded body includes a chamfer, wherein a main passage is formed between the chamfer and a wall of the housing and is connected to the hydrogen passage, and wherein the hydrogen is supplied from the exterior of the housing to the hydrogen passage through the main passage and is discharged from the hydrogen passage to the exterior of the housing through the main passage.

2. The reservoir as set forth in claim 1, wherein the molded body contains a highly heat conductive material.

3. The reservoir as set forth in claim 2, wherein the highly heat conductive material is copper.

4. The reservoir as set forth in claim 1, wherein the main passage extends along the molded body.

5. A reservoir for storing hydrogen, comprising:
a housing;
a plurality of storage units stacked in the interior of the housing, wherein each storage unit includes:
   a pair of plate-like molded bodies comprising a compressed hydrogen storage material powder, wherein each molded body causes exothermic reaction when absorbing hydrogen and causes endothermic reaction when releasing hydrogen, the molded body includes a first flat side and a second flat side opposite to the first side, the molded bodies are located with respect to each other such that the first sides face each other, and the thickness of each molded body is equal to or smaller than ten millimeters; and
   a heat exchanger located between the molded bodies, wherein the heat exchanger includes a flat duct in which a heat medium flows, the duct contacts the first side of each molded body, heat is transmitted from the molded bodies to the heat medium in the duct when the molded bodies absorb hydrogen, and heat is transmitted from the heat medium in the duct to the molded bodies when the molded bodies release hydrogen, and wherein the duct has a plurality of holes that extend parallel with each other in a longitudinal direction of the duct; and
a plurality of filters which form flat hydrogen passages, wherein the hydrogen passages are formed in the interior of the housing to face the second sides of the molded bodies,
wherein each molded body includes a chamfer, wherein a main passage is formed between each chamfer and a wall of the housing and is connected to the associated hydrogen passage, and wherein the hydrogen is supplied from the exterior of the housing to the hydrogen passages through the associated main passages and is discharged from the hydrogen passages to the exterior of the housing through the associated main passages.

6. The reservoir as set forth in claim 5, wherein each molded body contains copper.

7. The reservoir as set forth in claim 5, wherein the duct of each storage unit includes:
an upstream section and a downstream section, which extend parallel with each other; and
a connecting section, which connects the upstream section to the downstream section to form a substantially U-shaped heat medium passage in the duct.

8. The reservoir as set forth in claim 7, wherein:
the housing includes a main body for accommodating the storage units and a header attached to the main body;
the header defines an upstream chamber for receiving the heat medium from the exterior and a downstream chamber for discharging the heat medium to the exterior; and
the upstream section is connected to the upstream chamber while the downstream section is connected to the downstream chamber.

9. A reservoir for storing hydrogen, comprising:
a housing;
a plurality of storage units stacked in the interior of the housing, wherein each storage unit includes:
   a pair of plate-like molded bodies comprising a compressed hydrogen storage material powder, wherein each molded body causes exothermic reaction when absorbing hydrogen and causes endothermic reaction when releasing hydrogen, the molded body includes a first flat side and a second flat side opposite to the first side, the molded bodies are located with respect to each other such that the first sides face each other, and the thickness of each molded body is equal to or smaller than ten millimeters; and
   a heat exchanger located between the molded bodies, wherein the heat exchanger includes a flat duct in which a heat medium flows, the duct contacts the first side of each molded body, heat is transmitted from the molded bodies to the heat medium in the duct when the molded bodies absorb hydrogen, and heat is transmitted from the heat medium in the duct to the molded bodies when the molded bodies release hydrogen, and wherein the duct of each storage unit includes:
   a plurality of holes that extend parallel with each other in a longitudinal direction of the duct;
   an upstream section and a downstream section, which extend parallel with each other; and
   a connecting section, which connects the upstream section to the downstream section to form a substantially U-shaped heat medium passage in the duct; and
a plurality of filters which form flat hydrogen passages, wherein the hydrogen passages are formed in the interior of the housing to face the second sides of the molded bodies,
wherein each molded body includes a chamfer, wherein a main passage is formed between each chamfer and a wall of the housing and is connected to the associated hydrogen passage, and wherein the hydrogen is supplied from the exterior of the housing to the hydrogen passages through the associated main passages and is discharged from the hydrogen passages to the exterior of the housing through the associated main passages.

10. A reservoir for storing hydrogen, comprising:
a housing;
a molded body comprising a compressed hydrogen storage material powder accommodated in the housing, the molded body causes exothermic reaction when absorbing hydrogen and causes endothermic reaction when releasing hydrogen, and the molded body has a first side and a second side opposite to the first side, wherein the molded body has a plate-like shape, and the first and second sides of the molded body are flat and parallel with each other;
a heat medium passage formed in the interior of the housing to face the first side of the molded body, wherein heat is transmitted from the molded body to a heat medium in the heat medium passage when the molded body absorbs hydrogen, and heat is transmitted from the heat medium in the heat medium passage to the molded body when the molded body releases hydrogen, and wherein the heat medium passage includes a duct that has a plurality of holes that extend parallel with each other in a longitudinal direction of the duct, wherein the duct is flat, and the duct contacts the first side of the molded body; and
a filter which forms a hydrogen passage so that hydrogen permeates through the filter, wherein the hydrogen passage is formed in the interior of the housing to face the second side of the molded body, wherein the hydrogen passage is flat,
wherein the molded body includes a chamfer, wherein a main passage is formed between the chamfer and a wall of the housing and is connected to the hydrogen passage, and wherein the hydrogen is supplied from the exterior of the housing to the hydrogen passage through the main passage and is discharged from the hydrogen passage to the exterior of the housing through the main passage.

11. A reservoir for storing hydrogen, comprising:

a housing;

a plurality of storage units stacked in the interior of the housing, wherein each storage unit includes:

a pair of plate-like molded bodies comprising a compressed hydrogen storage material powder, wherein each molded body causes exothermic reaction when absorbing hydrogen and causes endothermic reaction when releasing hydrogen, the molded body includes a first flat side and a second flat side opposite to and parallel with the first side, and the molded bodies are located with respect to each other such that the first sides face each other; and a heat exchanger located between the molded bodies, wherein the heat exchanger includes a flat duct in which a heat medium flows, the duct contacts the first side of each molded body, heat is transmitted from the molded bodies to the heat medium in the duct when the molded bodies absorb hydrogen, and heat is transmitted from the heat medium in the duct to the molded bodies when the molded bodies release hydrogen, and wherein the duct has a plurality of holes that extend parallel with each other in a longitudinal direction of the duct; and a plurality of filters which form flat hydrogen passages so that hydrogen permeates through the filters, wherein the hydrogen passages are formed in the interior of the housing to face the second sides of the molded bodies, wherein each molded body includes a chamfer, wherein a main passage is formed between each chamfer and a wall of the housing and is connected to the associated hydrogen passage, and wherein the hydrogen is supplied from the exterior of the housing to the hydrogen passages through the associated main passages and is discharged from the hydrogen passages to the exterior of the housing through the associated main passages.

* * * * *